United States Patent
Partridge et al.

(10) Patent No.: US 10,900,423 B2
(45) Date of Patent: Jan. 26, 2021

(54) ON-BOARD SEPARATION PROCESS

(71) Applicant: ExxonMobil Research and Engineering Company, Annandale, NJ (US)

(72) Inventors: Randall D. Partridge, Califon, NJ (US); Benjamin A. McCool, Annandale, NJ (US); Dhaval A. Bhandari, East Brunswick, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 16/173,111

(22) Filed: Oct. 29, 2018

(65) Prior Publication Data
US 2019/0136786 A1    May 9, 2019

Related U.S. Application Data

(60) Provisional application No. 62/583,609, filed on Nov. 9, 2017.

(51) Int. Cl.
*F02D 19/06* (2006.01)
*F02D 41/38* (2006.01)
(Continued)

(52) U.S. Cl.
CPC ....... *F02D 19/0671* (2013.01); *B01D 61/002* (2013.01); *B01D 61/025* (2013.01);
(Continued)

(58) Field of Classification Search
CPC .................................................. F02D 19/0671
See application file for complete search history.

(56) References Cited

U.S. PATENT DOCUMENTS 7,337,754 B2 *  3/2008  Dearth ............... F02M 37/0088
                                                 123/1 A
7,493,897 B2 *  2/2009  Arakawa .............. B01D 61/027
                                                 123/304

(Continued)

OTHER PUBLICATIONS

Partridge Randall D., et al. "Onboard Gasoline Separation for Improved Vehicle Efficiency." SAE International Journal of Fuels and Lubricants, vol. 7, No. 2, 2014, p. 366. EBSCOhost, search. ebscohost.com/login.aspx?direct=true&db=edsjsr&AN=edsjsr. 26273030&site=eds-live&scope=site.*

(Continued)

*Primary Examiner* — Kevin R Steckbauer
(74) *Attorney, Agent, or Firm* — Priya G. Prasad (57) ABSTRACT

Systems and methods are provided for performing on-board separation of a fuel into a higher octane fuel fraction and a lower octane fuel fraction using a membrane under osmosis conditions. By performing the separation under osmosis conditions, the feed for separation can be exposed to the membrane without requiring prior heating. This can avoid the need for having a separate heat exchanger system for heating the feed to the membrane to a desired temperature range. Additionally or alternately, the permeate from the membrane separation can be at a pressure of roughly 100 kPa-a or higher. This can avoid the need for having an eductor to provide a pressure below 100 kPa-a for the permeate side of the membrane. The fuel fractions produced during the membrane separation can then be used as fuel in a dual-fuel spark ignition engine.

16 Claims, 2 Drawing Sheets

(51) Int. Cl.
  *B01D 61/02* (2006.01)
  *B01D 61/00* (2006.01)
  *B01D 69/12* (2006.01)
  *F02D 19/12* (2006.01)
  *F02B 17/00* (2006.01)
  *F02D 41/30* (2006.01)
  *B01D 71/02* (2006.01)

(52) U.S. Cl.
  CPC .............. *F02D 41/38* (2013.01); *B01D 69/12* (2013.01); *B01D 71/021* (2013.01); *F02B 17/005* (2013.01); *F02D 19/12* (2013.01); *F02D 41/3094* (2013.01)

(56) References Cited

U.S. PATENT DOCUMENTS

| | | | | |
|---|---|---|---|---|
| 7,976,700 | B2* | 7/2011 | Arakawa | F02M 37/24 210/114 |
| 8,118,009 | B2* | 2/2012 | Pursifull | F02M 31/18 123/434 |
| 8,119,006 | B2* | 2/2012 | Patil | C10G 31/11 210/640 |
| 8,459,238 | B2* | 6/2013 | Pursifull | F02M 25/089 123/516 |
| 8,550,058 | B2* | 10/2013 | Pursifull | F02D 19/0605 123/575 |
| 8,765,824 | B2* | 7/2014 | Shaffer | B01D 71/46 521/27 |
| 9,010,305 | B2* | 4/2015 | Leone | F02D 19/0671 123/575 |
| 9,038,613 | B2* | 5/2015 | Pursifull | F02D 19/0605 123/575 |
| 9,121,355 | B2* | 9/2015 | Leone | F02D 19/0649 |
| 9,273,618 | B2* | 3/2016 | Bromberg | F02D 19/0655 |
| 9,382,854 | B2* | 7/2016 | Leone | F02D 19/0671 |
| 9,546,583 | B2* | 1/2017 | Leone | F02M 37/0088 |
| 10,011,909 | B2* | 7/2018 | Emerick | C25B 15/08 |
| 10,124,294 | B2* | 11/2018 | Hamad | F02M 37/0011 |
| 10,478,778 | B2* | 11/2019 | Zhou | B01D 67/0088 |
| 2008/0092851 | A1* | 4/2008 | Arakawa | B01D 61/027 123/445 |
| 2008/0128350 | A1* | 6/2008 | Arakawa | F02M 37/24 210/500.21 |
| 2008/0200696 | A1* | 8/2008 | Miller | C10G 31/11 548/485 |
| 2009/0157277 | A1* | 6/2009 | Pursifull | F02M 31/18 701/102 |
| 2009/0159057 | A1* | 6/2009 | Pursifull | F02M 63/0225 123/575 |
| 2009/0277837 | A1* | 11/2009 | Liu | B01D 71/10 210/650 |
| 2010/0059441 | A1* | 3/2010 | Pattil | B01D 71/60 210/651 |
| 2010/0108605 | A1* | 5/2010 | Patil | B01D 61/362 210/643 |
| 2012/0152211 | A1* | 6/2012 | Pursifull | F02M 43/00 123/520 |
| 2012/0270958 | A1* | 10/2012 | Shaffer | C10L 1/023 521/27 |
| 2013/0014731 | A1* | 1/2013 | Pursifull | F02D 19/081 123/525 |
| 2013/0167804 | A1* | 7/2013 | Leone | F01N 3/005 123/456 |
| 2013/0289850 | A1* | 10/2013 | Johnson | F02D 19/0649 701/104 |
| 2014/0034021 | A1* | 2/2014 | Pursifull | F02M 43/00 123/456 |
| 2015/0052876 | A1* | 2/2015 | Leone | F02D 41/0025 60/273 |
| 2015/0052877 | A1* | 2/2015 | Leone | F17D 3/01 60/273 |
| 2015/0053189 | A1* | 2/2015 | Leone | F02D 19/0634 123/575 |
| 2015/0308312 | A1* | 10/2015 | Leone | F02D 19/0671 60/274 |
| 2017/0136420 | A1* | 5/2017 | McCool | C07C 5/2732 |
| 2017/0144106 | A1* | 5/2017 | McCool | B01D 69/12 |
| 2017/0314143 | A1* | 11/2017 | Emerick | C25B 15/08 |
| 2017/0368504 | A1* | 12/2017 | Hamad | B01D 61/027 |
| 2018/0087466 | A1* | 3/2018 | Bromberg | F02D 41/402 |
| 2018/0154311 | A1* | 6/2018 | Zhou | B01D 71/48 |
| 2019/0001273 | A1* | 1/2019 | Zhou | B01D 67/0006 |
| 2019/0136734 | A1* | 5/2019 | Weiss | F01N 3/206 |

OTHER PUBLICATIONS

Partridge et al., "Onboard Gasoline Separation for Improved Vehicle Efficiency", SAE Int. J. Fuels. Lubr., 2014, 7, 366-378.

Weiss et al., "Treatment of Combustion Exhaust", U.S. non-provisional patent application filed by ExxonMobil Research and Engineering Company on Oct. 29, 2018.

\* cited by examiner

ON-BOARD SEPARATION PROCESS

CROSS-REFERENCE TO RELATED APPLICATIONS

This application claims priority to U.S. Provisional Application No. 62/583,609 filed Nov. 9, 2017, which is herein incorporated by reference in its entirety.

FIELD

Systems and methods are provided for separation of a fuel within a vehicle to generate fuel fractions having different combustion properties for use in the vehicle engine.

BACKGROUND

Conventional internal combustion engine designs can typically include a single fuel for combustion within the engine cylinders. This can require careful selection of an appropriate fuel, so that the fuel has appropriate combustion properties, such as a suitable Research Octane Number or a suitable flame speed. This can limit the selection of fuels, as some compositions that may be suitable from an energy content standpoint can lack appropriate combustion properties.

For engines that operate based on spark ignition, another consideration can be the compression ratio for the engine. Engines with higher compression ratios can operate with higher fuel efficiency, but higher compression engines are also typically more susceptible to "knocking", which can occur when the air-fuel mixture in a cylinder begins the ignition process prior to introduction of the spark. As a result, the compression ratio for a spark ignition engine in many types of vehicles is limited to less than 10.0, in order to accommodate typical regular unleaded gasoline compositions.

SAE paper 2014-01-1200 provides an example of systems and methods for using a pervaporation membrane to perform an on-board separation of an ethanol-containing unleaded gasoline to form a higher octane fraction enriched in ethanol and aromatics and a lower octane fraction. Operating the membrane under pervaporation conditions requires addition of substantial additional equipment to the engine and/or fuel system. This can include a heat pipe to capture heat from the catalytic converter exhaust for increasing the temperature of the fuel delivered to the membrane, as well as an eductor to allow the permeate side of the membrane to operate at reduced pressure conditions (i.e., below 50 kPa-a). Potential fuel efficiency benefits of selectively using the higher octane fraction as the engine fuel during high load conditions are described. The selective use of the higher octane fraction is described as allowing the higher octane fraction to be conserved during lower load conditions, so that the overall operation method can reduce or minimize knocking while operating the engine at a compression ratio of 13.0.

U.S. Pat. No. 9,273,618 describes an example of operation of an alcohol boosted gasoline engine. The engine includes reservoirs for two types of fuel, including at least one fuel with an elevated alcohol content.

What is needed are systems and/or methods that can allow for on-board separation of spark ignition fuels to form a higher octane fraction while reducing or minimizing the additional equipment required in the fuel system and/or engine environment.

SUMMARY

In various aspects, a method of operating a spark ignition engine is provided. The method can include exposing a fuel comprising 5 vol % or more of ethanol to a membrane under osmosis conditions to form at least a permeate and a retentate. The fuel can optionally correspond to a fuel with a research octane number (RON) of 90 or more. The osmosis conditions can include exposing the fuel to the membrane at a pressure of 1.0 MPa-g or more. The permeate can correspond to an ethanol-enriched fraction and/or a fraction having an increased RON, such as a RON that is at least 5 higher than the RON of the fuel and/or a RON of 95 or more. The retentate can correspond to a fraction having a decreased RON, such as a RON that is at least 2 lower than an RON of the fuel and/or a RON of 88 or less. During a first time period, at least a portion of the ethanol-enriched fraction can be combusted in a combustion chamber to operate an engine. During a second time period, at least a portion of the second fraction can be combusted in the combustion chamber to operate the engine.

In some aspects, the fuel can include various amounts of ethanol, such as 10 vol % to 85 vol % of ethanol, or 5 vol % to 49 vol %. The permeate can include 10 vol % of ethanol or more, or 20 vol % or more, or 40 vol % or more.

In some aspects, the membrane can correspond to a porous carbon membrane. In some aspects, the osmosis conditions can further include forming the permeate at a pressure of at least 90 kPa-a. In some aspects, the osmosis conditions can further include exposing the fuel to the membrane at a temperature of 100° C. or less.

The ability to operate an engine with two different types of fuel can be beneficial for allowing the compression ratio for a gasoline engine (or the effective compression ratio for a boosted gasoline engine) to be higher while still having a reduce or minimized likelihood of knocking. In some aspects, the engine can operates at a compression ratio and/or effective compression ratio of 10.5 or more.

In various aspects, a dual-fuel engine and fuel system is also provided. Optionally, the dual-fuel engine can correspond to a boosted engine. The dual-fuel engine and fuel system can include a first fuel pump comprising a first fuel pump intake in fluid communication with a fuel tank and a first fuel pump outlet. The dual-fuel engine and fuel system can further include a reverse osmosis membrane separator comprising a porous carbon membrane, a separator inlet, a separator retentate outlet, and a separator permeate outlet. The separator inlet can be in fluid communication with the first fuel pump outlet. The dual-fuel engine and fuel system can further include a second fuel pump comprising a second fuel pump intake in fluid communication with the separator permeate outlet and further comprising a second fuel pump outlet. The dual-fuel engine and fuel system can further include a spark ignition engine comprising one or more combustion zones. The one or more combustion zones can be in fluid communication with the second fuel pump outlet and can be further in fluid communication with the separator retentate outlet. Optionally, the one or more combustion zones can be in fluid communication with the fuel tank via an accumulator.

In some aspects, the dual-fuel engine and fuel system can further include a third fuel pump comprising a third fuel pump intake and a third fuel pump outlet. In such aspects, the reverse osmosis membrane separator can be in indirect fluid communication with the first fuel pump outlet via the third fuel pump intake and the third fuel pump outlet.

In some aspects, the one or more combustion zones can include one or more first injection ports and one or more second injection ports. Optionally, the one or more combustion zones can be in fluid communication with the second fuel pump outlet via the one or more first injection ports.

Optionally, the one or more combustion zones can be in fluid communication with the separator retentate outlet via the one or more second injection ports. Optionally, the one or more first injection ports can correspond to direct injection ports.

DETAILED DESCRIPTION

All numerical values within the detailed description and the claims herein are modified by "about" or "approximately" the indicated value, and take into account experimental error and variations that would be expected by a person having ordinary skill in the art.

Overview

In various aspects, systems and methods are provided for performing on-board separation of a fuel into a higher octane fuel fraction and a lower octane fuel fraction using a membrane under osmosis conditions. By performing the separation under osmosis conditions, the feed for separation can be exposed to the membrane without requiring prior heating. This can avoid the need for having a separate heat exchanger system for heating the feed to the membrane to a desired temperature range. Additionally or alternately, the permeate from the membrane separation can be at a pressure of roughly 100 kPa-a or higher. This can avoid the need for having an eductor to provide a pressure below 100 kPa-a for the permeate side of the membrane. Thus, relative to a membrane separation system based on pervaporation, separating under osmosis conditions can reduce or minimize the amount of additional equipment needed to separate a fuel into a higher octane fuel fraction and a lower octane fuel fraction for combustion in a dual-fuel engine. The fuel fractions produced during the membrane separation (the lower octane retentate and the higher octane permeate) can then be used as fuel in a dual-fuel spark ignition engine. The higher octane fuel fraction can be selectively used for higher engine load conditions while the lower octane fuel fraction is used for general engine operating conditions.

In some aspects, the separation can be based on use of a porous carbon membrane. The porous carbon membrane can be operated under reverse osmosis and/or forward osmosis conditions to perform the separation. This can be beneficial, as the fuel pump typically present in a modern engine can be used to provide pressurized fuel to the porous carbon membrane for the separation under osmosis conditions.

Many gasoline boiling range fuels now contain 5 vol % or more of ethanol, or 10 vol % or more. In addition to being a high octane component, ethanol also has a smaller effective molecular diameter than many typical components in a gasoline boiling range fuel, such as larger paraffins. As a result, a membrane separation can be used to form a permeate enriched in ethanol. Depending on the size of the pores in the membrane, the permeate can also be selective for aromatics relative to larger alkanes. Such aromatics can also correspond to high octane components. By contrast, straight chain alkanes that contain 7 carbons or more can correspond to lower octane components of a gasoline boiling range fuel. Such longer straight chain alkanes can have a relatively large molecular diameter and can be selectively retained in the retentate during a membrane separation. The net result of performing such a separation can be to form a permeate with an increased octane value and a retentate with a decreased octane value.

Although some conventional types of membranes are available for separation of ethanol and/or aromatics from alkanes, such conventional membranes typically operate under pervaporation conditions. Pervaporation conditions can increase the driving force for transporting compounds across the membrane while avoiding conditions that might lead to degradation of the structure of the membrane. For example, the feed to a pervaporation membrane can typically be delivered at a pressure slightly above atmospheric pressure. Instead of further elevating the pressure on the retentate side of the membrane, under pervaporation conditions the pressure on the permeate side of the membrane can be reduced to sub-atmospheric pressures in order to improve the rate of flow across the membrane. The temperature of the feed to the membrane can also be elevated to increase the separation rate during pervaporation.

Unfortunately, implementing pervaporation conditions for a membrane separation of fuel can present challenges in an engine environment. Fuel delivery systems are typically designed to deliver fuel to combustion chambers in an engine under elevated pressure conditions rather than sub-atmospheric. In order to provide sub-atmospheric conditions for pervaporation, additional equipment can be included in an engine, such as an eductor. Additionally, in order to provide fuel to a pervaporation membrane at elevated temperature but prior to pressurization, an additional method for heating the fuel is needed. This can be provided based on heat exchange with other flows in the engine environment, but this requires at least additional piping and structures. Still further heat exchange can be used to reduce the temperature of the resulting separated fuel fractions after the membrane separation.

In contrast to pervaporation conditions, separations performed under osmosis conditions that include a pressure of 1.0 MPa-g or more, or 10 MPa-g or more. For example, the osmosis conditions can include a pressure of 1.0 MPa-g to 500 MPa-g, or 5.0 MPa-g to 500 MPa-g, or 10 MPa-g to 500 MPa-g, or 1.0 MPa-g to 200 MPa-g, or 5.0 MPa-g to 200 MPa-g. With regard to temperature, the fuel delivered to the membrane can be at any convenient temperature that allows fuel to flow to the membrane for separation. This can correspond to a temperature of −30° C. to 100° C., or −30° C. to 60° C., or any other convenient temperature range that might typically be encountered in a fuel system for a spark ignition vehicle. Additionally or alternately, the pressure on the permeate side of the membrane can be any convenient pressure, so that an eductor or other similar structure is not needed to create a reduced pressure environment. For example, the pressure of the permeate can be at least 90 kPa-a, or at least 100 kPa-a, or at least 150 kPa-a, such as up to 1000 kPa-a or possibly still higher.

The ability to perform an in-situ and/or on-board separation of fuel into a higher octane fraction and a lower octane fraction can enable use of a "dual-fuel" engine in a vehicle. A dual-fuel engine refers to an engine that can be operated using either a lower octane fuel or a higher octane fuel. For example, one option could be to have two sets of fuel injectors for the cylinders in an engine. A first set of fuel injectors, such as direct fuel injectors, can be used for introducing the lower octane fuel into the cylinders for combustion. A second set of fuel injections, such as port fuel injectors, can be used for introducing the higher octane fuel into the cylinders for combustion. The selection of which fuel to introduce into the cylinder can be made based on the load conditions for the engine.

In some aspects, an engine including two sets of fuel injectors can correspond to an alcohol boosted gasoline engine, where the engine manifold pressure is increased relative to ambient by turbocharging. This type of engine is referred to herein as a "boosted engine". In such aspects, a boosted engine with two sets of fuel injectors can include direct fuel injectors for the ethanol-enriched fuel. Due to the higher manifold pressure, the effective compression ratio of the boosted engine can be elevated even though the absolute value of the compression ratio may be lower. In addition to allowing for use of a second fuel type, direct injection of the ethanol-enriched fuel can also provide anti-knock advantages based on evaporative cooling of the ethanol during direct injection.

By using two sets of fuel injectors and/or allowing two different fuels to be injected into the cylinders, a dual-fuel engine can be operated at a higher compression ratio and/or a higher effective compression ratio while still reducing or minimizing knocking. Operating at a higher compression ratio (or higher effective compression ratio) can be beneficial for improving gas mileage for a vehicle. However, knocking can occur under higher load conditions for an engine if the fuel does not have sufficient octane. The knocking corresponds to combustion prior to the desired timing for combustion in the engine, which can occur when additional fuel is introduced into the cylinders. Conventionally, such knocking is avoided using standard commercial gasolines by using engines that operate at a compression ratio of roughly 9.8. By contrast, in aspects where an engine can be operated using fuels with two different octane values, a compression ratio (or effective compression ratio for a boosted engine) of at least 10.0, or at least 10.5, or at least 11.0, or at least 11.5, or at least 12.0, or at least 14.0 can be used, such as up to 18.0 or possibly still higher. During lower loads on the engine, the lower octane fuel available to the engine can be used while still substantially avoiding knocking behavior. At higher loads, the higher octane fuel can be used in order to reduce or minimize knocking.

In various aspects, the fuel delivered to a porous carbon membrane for separation into a higher octane fraction and a lower octane fraction can correspond to a gasoline (or other fuel corresponding to ethanol plus naphtha boiling range components) having a RON of 90 or more, or 92 or more, or 94 or more, such as up to 98 or possibly still higher. Optionally, the fuel delivered to the porous carbon membrane can contain 5 vol % or more of ethanol, or 10 vol % or more, or 20 vol % or more, or 50 vol % or more, such as up to 85 vol %. Optional examples of suitable fuels can correspond to fuels containing 5 vol % to 49 vol % ethanol, or 10 vol % to 49 vol %, or 5 vol % to 85 vol %, or 10 vol % to 85 vol %, or 20 vol % to 49 vol %, or 20 vol % to 85 vol %. In various aspects, the RON of the higher octane fraction can be higher than the RON of the fuel delivered to the membrane, such as at least 5 greater or at least 8 greater. The resulting higher octane fraction can have a RON of 95 or more, or 98 or more, or 100 or more, or 102 or more, such as up to 106 or possibly still higher. In various aspects, the RON of the lower octane fraction can be lower than the RON of the fuel delivered to the membrane, such as at least 2 lower, or at least 4 lower. In some aspects, the lower octane fraction can have a RON of 88 or less, or 86 or less, or 84 or less, such as down to 80 or possibly still lower. RON can be determined according to ASTM D2699. The resulting higher octane fraction, corresponding to an ethanol-enriched fraction, can have an ethanol content of 10 vol % or more, or 20 vol % or more, or 40 vol % or more, such as up to 90 vol % or possibly still higher.

Membrane Separation of Ethanol from Fuel

In various aspects, ethanol can be separated from an ethanol-containing fuel in the engine environment. Suitable fuels can correspond to a fuel for a spark ignition engine with an ethanol content of roughly 5 vol % or more, or 10 vol % or more, or 20 vol % or more, or 50 vol % or more, such as up to 85 vol % of ethanol, or possibly still higher. In some aspects, the fuel can correspond to an "E85" gasoline, which generally refers to a fuel having roughly 50 vol % to 85 vol % of ethanol content, with the remaining portion of the fuel corresponding to a naphtha boiling range and/or gasoline boiling range fuel. In some aspects, a suitable fuel can correspond to a naphtha boiling range and/or gasoline boiling range fuel that also includes 5 vol % to 49 vol % of ethanol, or 10 vol % to 49 vol %.

A suitable method for separating ethanol from a fuel can be to perform a membrane separation under reverse osmosis conditions, forward osmosis conditions, or a combination thereof. A suitable membrane for separation under osmosis conditions can correspond to an asymmetric membrane structure having a porous carbon layer as the selective layer. In an asymmetric membrane structure, a first membrane layer can correspond to a selective layer while a second membrane layer can correspond to a porous support layer. Examples of asymmetric membrane structure including a porous carbon layer as a selective layer are described in U.S. Patent Application Publication 2017/0136420, which is incorporated herein by reference for the limited purpose of describing the formation of asymmetric membrane structures that include a porous carbon layer as the selective layer.

The first membrane layer or selective layer can have an amorphous interconnected pore structure that is formed by pyrolysis of the layer, after optional cross-linking. The amorphous interconnected pore structure can allow for selective separation of compounds based on molecular size under conditions suitable for hydrocarbon reverse osmosis. Because passage of permeating species through the selective layer is constrained during a separation, the selective layer can be relatively thin to maintain a desirable transport rate across the membrane. Depending on the aspect the thickness of the selective layer can be about 0.1 μm to about 5 μm, or possibly less.

To provide a sufficient number of pores for transport, the selective layer can have a surface area as measured by nitrogen adsorption (BET) of at least about 100 m$^2$/g, or at least about 200 m$^2$/g, or at least about 300 m$^2$/g, or at least about 500 m$^2$/g, or at least about 600 m$^2$/g, or at least about 700 m$^2$/g of pores having a pore size between 5 Angstroms and 100 Angstroms, or between 5 and 75 Angstroms, or between 5 and 50 Angstroms, or between 5 Angstroms and 35 Angstroms, or between 5 Angstroms and 20 Angstroms. The pores in the selective layer can have any type of pore size distribution, such as a unimodal distribution, a bimodal distribution, or a multi-modal distribution.

Based in part on the interconnected nature of the amorphous pore structure, the transport characteristics of the selective layer can be defined based on the substantial pore size peak in the pore size distribution (such as pore width distribution) corresponding to the smallest median pore size. A substantial pore size peak is defined herein as a peak in a pore size distribution corresponding to at least 5 vol % of the pore volume. The pore size corresponding to a maximum height of a pore size peak in the pore size distribution can be referred to as a median pore size. The width of a pore size peak can be characterized based on the width of a pore size peak at half of the maximum height.

The support layer or second layer of the asymmetric membrane structure can correspond to any convenient type of layer that can provide structural support for the selective layer while having a reduced or minimized impact on transport of components through the membrane. In some aspects the support layer can correspond to a polymer layer with a larger pore size network than the selective layer. In some aspects the support layer can correspond to a porous metal layer.

Examples of polymers suitable for formation of an asymmetric membrane structure (or for formation of at least the selective layer of the asymmetric membrane structure) can include, but are not limited to, polyimide polymers (such as Matrimid® 5218, available from Ciba Specialty Chemicals), polyamide-imide polymers (such as Torlon® polymers available from Solvay Specialty Polymers), polyetherimide polymers (such as Ultem® resins available from SABIC), and partially or fully fluorinated polyethylene and/or polypropylene polymers (or co-polymers), such as polyvinylidene fluoride or polytetrafluoroethylene. More generally, suitable polymers may include glassy polymers, polymers with high intrinsic microporosity, and/or polymers that when are known to form a porous carbon structure when the cross-linked polymer is exposed to pyrolysis conditions.

Configuration Examples

Figure 1:
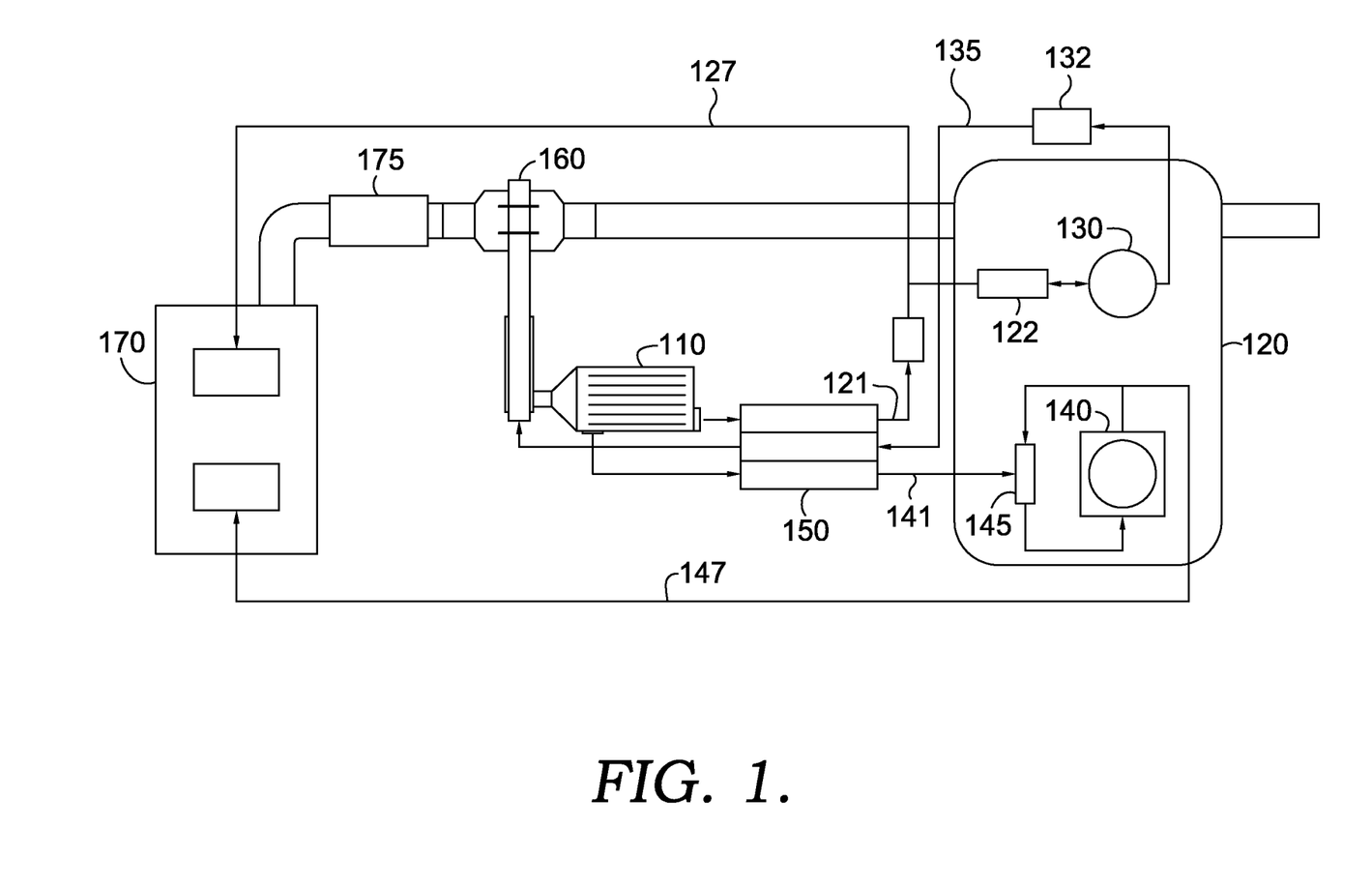
FIG. 1 schematically shows an example of an engine and fuel system configuration for generating a higher octane fraction and a lower octane fraction based on separation under pervaporation conditions.

FIG. 1 shows an example of a conventional pervaporation system for membrane separation in an engine environment similar to the configuration shown in SAE 2014-01-1200. The system shown in FIG. 1 also includes a dual-fuel engine to allow for operation using either a lower octane fuel or a higher octane fuel.

In FIG. 1, a fuel tank 120 can contain a fuel suitable for separation into a higher octane fraction and a lower octane fraction, such as an ethanol-containing fuel or a highly aromatic gasoline. A first fuel pump 130 can be used to deliver fuel to a flow controller 132 that produces a regulated flow 135 of fuel at a desired flow rate. The regulated flow 135 of fuel is passed through a heat exchanger 150 to increase the temperature of the regulated flow 135. Further heating of the regulated flow 135 can occur in heat pipe 160, which allows for heat exchange with the exhaust from catalytic converter 175. This can heat the regulated flow 135 to a desired temperature prior to the regulated flow 135 entering the membrane 110. For example, the temperature of the regulated flow 135 of fuel can be increased to roughly 140° C. to 160° C. prior to being exposed to the membrane 110. The amount of fuel delivered to the membrane 110 can vary, but is generally around 1 g/s.

In FIG. 1, membrane 110 corresponds to a polymer membrane operated under pervaporation conditions. The membrane 110 can generate a permeate 141 corresponding to a higher octane fraction and a retentate 121 corresponding to a lower octane fraction. The permeate 141 and the retentate 121 can be passed through heat exchanger 150 for initial heating of regulated flow 135. An eductor 145 is used to maintain a pressure on the permeate side of membrane 110 of 20 kPa or less, such as roughly 15 kPa. A second pump 140 can be used to increase the pressure of the permeate 141 prior to passing the permeate 141 into the engine 170 via line 147.

During operation at low load, retentate 121 can be passed through line 127 for use as fuel in dual-fuel engine 170, while permeate 141 can be stored for use. During high load operation, permeate 141 can be passed through line 147 for use as fuel in dual-fuel engine 170 while retentate 121 can be passed back into fuel tank 130 via accumulator 122. In high demand situations, fuel from fuel tank 130 can be delivered to line 127 via accumulator 122. This can prevent excessive dilution of the fuel in fuel tank 130 with retentate.

Figure 2:
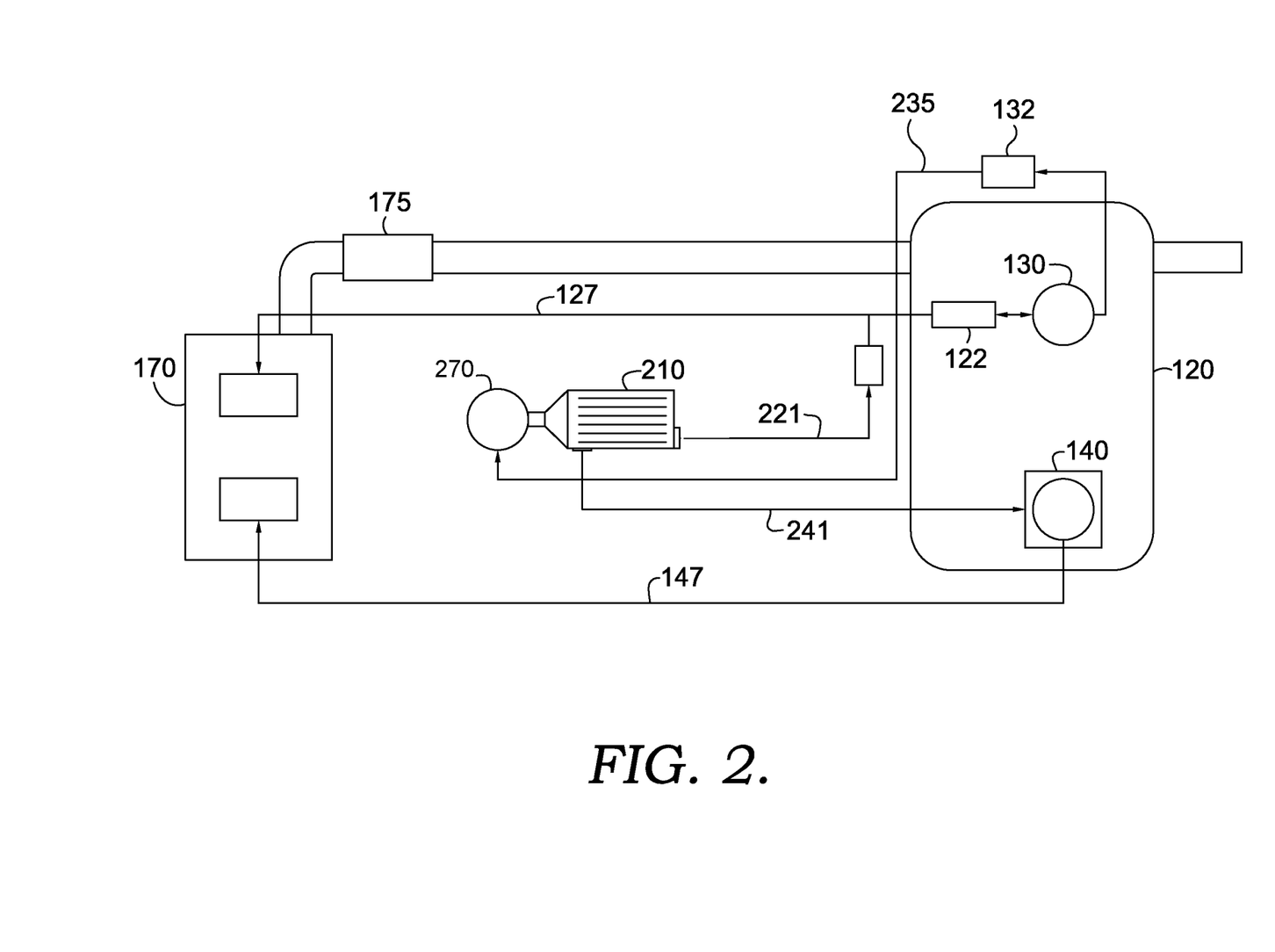
FIG. 2 schematically shows another example of an engine and fuel system configuration for generating a higher octane fraction and a lower octane fraction based on separation using a porous carbon membrane.

In contrast to FIG. 1, FIG. 2 shows a configuration for providing different fuel fractions to a dual-fuel engine based on separation under osmosis conditions. In FIG. 2, regulated flow 235 of fuel is delivered to membrane 210 without requiring passage through a heat exchanger or other heat pipe. Instead, an additional pump 270 can be used to further increase the pressure of the regulated flow 235 of fuel prior to exposing the regulated flow 235 to the membrane 210. Membrane 210 can correspond to, for example, a porous carbon membrane that is operated under osmosis conditions. The membrane 210 can produce a permeate 241 corresponding to a higher octane fraction and a retentate 221 corresponding to a lower octane fraction. Because permeate 241 can be produced at ambient pressure, an eductor is not needed.

Separation Example—Osmotic Separation of Ethanol from Fuel

In the following example, a single membrane layer formed from a Matrimid® polymer was used to separate ethanol from toluene under reverse osmosis conditions. It is believed that incorporation of a similar porous carbon layer as part of an asymmetric membrane structure would allow for separation of ethanol from toluene at similar selectivity but at higher permeation rates. The conditions below can be considered as reverse osmosis conditions based on the elevated pressure used to cause permeation across the membrane. However, the conditions below can also be similar to forward osmosis conditions based on the use of a sweep stream to remove permeated products from the permeate side of the membrane. It is noted that the pressure driving force for a separation can correspond to osmotic pressure, hydraulic pressure, or both.

Hollow fibers of Matrimid® were extruded as a single layer fiber. The extruded fibers were calcined according to a procedure similar to the procedures described in U.S. Patent Application Publication 2017/0136420 for calcining an asymmetric membrane structure to form a porous carbon layer. The resulting porous carbon hollow fibers were roughly 104 mm long, had a roughly 230 µm outer diameter, an inner diameter of roughly 150 µm, and a wall thickness of roughly 40 µm. A separation module having a shell and tube configurations was made using 14 of the porous carbon hollow fibers.

The separation module was used to perform a separation of a 50 vol %/50 vol % mixture of toluene and ethanol. The mixture of toluene and ethanol was circulated on the outside (shell side) of the fibers at a rate of 4 ml/min at a pressure of 200 barg (20 MPag) and a temperature of about 21° C. After reaching steady state for the flow of the toluene/ethanol mixture, the internal volume (bore or tube side) of the fibers was filled with isooctane at a pressure of about 1 barg (0.1 MPag). The isooctane acted as a draw solution to provide a forward osmosis effect acting in conjunction with the hydraulic pressure differential of 20 MPag between the shell side and bore side of the membrane.

Approximately 24 hours after filling the bore with the isooctane draw solution, samples were withdrawn from the permeate side and the retentate side for analysis. Due to the thickness of the single (selective) layer of the hollow fiber membranes in the separation module (>40 μm), the total amount of permeate transported across the membrane corresponded to less than 0.1 vol % of the feed that was exposed to the separation module. However, the permeate collected during the reverse osmosis separation indicated a significant increase in ethanol concentration relative to toluene in the permeate. It is noted that back diffusion of isooctane draw solution across the membrane in the opposite direction was negligible (~0.0001 vol % isooctane detected in the retentate). The separation factor ratio of ethanol to toluene in the permeate (vol/vol) was 6.9, as determined by $\{(X_{ethanol}/X_{toluene})_{permeate}/(X_{ethanol}/X_{toluene})_{retentate}\}$, where "X" is the volume of the component in either the permeate or the retentate. This corresponded to 87.3 vol % ethanol and 12.7 vol % toluene for the composition of the permeate that traversed the membrane. Although the flux across the membrane was low, the results demonstrate the suitability of the porous carbon layer for separation of ethanol from toluene. Without being bound by any particular theory, it is believed that under conditions corresponding to higher yields, additional permeation of lower molecular weight paraffins and/or aromatics may occur, so that the resulting permeate has suitable properties for combustion as a gasoline. It is believed that permeation of branched paraffins will remain low.

Comparative Example—Pervaporation for Separation of Ethanol from Fuel

An ethanol stable membrane monolith was made by coating a suitable monolith with an epoxy-amine membrane formed using a combination of a) 1,2,7,8-Diepoxy-n-octane (DENO) and b) poly(propylene glycol)-bis(2-aminopropyl ether) with a number average molecular weight of roughly 400 (D400). Additional details regarding formation of this type of membrane can be found, for example, in U.S. Pat. No. 8,765,824. The DENO-D400 membrane monolith was evaluated in a test using with a model feed composed of n-heptane, toluene, and ethanol to evaluate aromatic and ethanol pervaporation separation from aliphatic hydrocarbons. The model feed included 9.2 wt % of ethanol, which was intended to be representative of an "E10" gasoline.

Table 1 shows results from pervaporation of the model feed. The data in Table 1 was obtained after performing the pervaporation separation for roughly 215 hours. The rate of feed flow to the membrane was 1.01 g/sec. The pressure on the retentate side of the membrane was 490 kPa-g. The temperature on the retentate side was 80° C. The corresponding temperature and pressure on the permeate side of the membrane were 70° C. and 15.3 kPa-a, which is substantially less than atmospheric pressure. Under these conditions, the permeate rate was roughly stabilized at 0.28 g/m²-sec, which resulted in a yield of permeate of roughly 3.1 wt % relative to the feed rate. The flux across the membrane was 9.5 g-μm/m²-sec. As shown in Table 1, the permeate composition was 14.5 wt % n-heptane, 39.1 wt % toluene, and 46.4 wt % ethanol. This corresponded to an aromatic selectivity (relative to n-heptane) of 2.9 and an ethanol plus aromatic selectivity of 5.5. The concentration of ethanol in the permeate was roughly five times greater than the concentration of ethanol in the feed.

TABLE 1

E10 Model Feed Example for Pervaporation Separation

|  | Feed | Permeate | Retentate |
| --- | --- | --- | --- |
| Yield (wt %) | 100.0 | 3.1 | 97.9 |
| Composition (wt %) |  |  |  |
| n-heptane | 46.9 | 14.5 | 45.1 |
| Toluene | 43.8 | 39.1 | 30.6 |
| Ethanol | 9.2 | 46.4 | 7.2 |

The results in Table 1 show that pervaporation can result in forming an ethanol-enriched permeate that also includes a substantial portion of toluene, as well as some n-heptane. While this is a suitable high octane fraction, substantial additional equipment is required to produce this fraction.

ADDITIONAL EMBODIMENTS

Embodiment 1

A method of operating a spark ignition engine, comprising: exposing a fuel comprising 5 vol % or more of ethanol to a membrane under osmosis conditions to form at least a permeate comprising an ethanol-enriched fraction and a retentate, the ethanol-enriched fraction comprising about 10 vol % or more of ethanol; combusting, during a first time period, at least a portion of the ethanol-enriched fraction in a combustion chamber to operate an engine; combusting, during a second time period, at least a portion of the retentate in the combustion chamber to operate the engine, wherein the osmosis conditions include exposing the fuel to the membrane at a pressure of 1.0 MPa-g or more, the fuel optionally comprising a RON of 90 or more.

Embodiment 2

The method of Embodiment 1, wherein the fuel comprises 5 vol % to 85 vol % of ethanol, or 5 vol % to 49 vol %, or 10 vol % to 85 vol %, or 10 vol % to 49 vol %, or 20 vol % to 85 vol %, or 20 vol % to 49 vol %.

Embodiment 3

The method of any of the above embodiments, wherein the permeate comprises 10 vol % of ethanol or more, or 20 vol % or more, or 40 vol % or more.

Embodiment 4

The method of any of the above embodiments, wherein the membrane comprises a porous carbon membrane.

Embodiment 5

The method of any of the above embodiments, wherein the osmosis conditions further comprise forming the permeate at a pressure of at least 90 kPa-a, or at least 100 kPa-a, or at least 150 kPa-a, or wherein the osmosis conditions further comprise exposing the fuel to the membrane at a temperature of 100° C. or less (or 60° C. or less), or a combination thereof.

Embodiment 6

The method of any of the above embodiments, wherein a RON of the permeate is at least 5 greater than the RON of the fuel, or wherein the RON of the permeate is at least 95, or at least 98, or at least 100, or at least 105, or a combination thereof.

Embodiment 7

The method of any of the above embodiments, wherein a RON of the retentate is at least 2 lower than the RON of the fuel, or wherein a RON of the retentate is 88 or less, or 86 or less, or 84 or less, or 80 or less, or a combination thereof.

Embodiment 8

The method of any of the above embodiments, wherein the engine operates at a compression ratio of 10.5 or more, or 11.0 or more, or 12.0 or more; or wherein the engine comprises a boosted engine that operates at an effective compression ratio of 10.5 or more, or 12.0 or more, or 14.0 or more.

Embodiment 9

A dual-fuel engine and fuel system, comprising: a first fuel pump comprising a first fuel pump intake in fluid communication with a fuel tank and a first fuel pump outlet; a reverse osmosis membrane separator comprising a porous carbon membrane, a separator inlet, a separator retentate outlet, and a separator permeate outlet, the separator inlet being in fluid communication with the first fuel pump outlet; a second fuel pump comprising a second fuel pump intake in fluid communication with the separator permeate outlet and further comprising a second fuel pump outlet; and a spark ignition engine comprising one or more combustion zones, the one or more combustion zones being in fluid communication with the second fuel pump outlet and being further in fluid communication with the separator retentate outlet.

Embodiment 10

The dual-fuel engine and fuel system of Embodiment 9, wherein the one or more combustion zones are further in fluid communication with the fuel tank via an accumulator.

Embodiment 11

The dual-fuel engine and fuel system of Embodiment 9 or 10, further comprising a third fuel pump comprising a third fuel pump intake and a third fuel pump outlet, the reverse osmosis membrane separator being in indirect fluid communication with the first fuel pump outlet via the third fuel pump intake and the third fuel pump outlet.

Embodiment 12

The dual-fuel engine and fuel system of any of Embodiments 9 to 11, wherein the one or more combustion zones comprise one or more first injection ports and one or more second injection ports, the one or more combustion zones being in fluid communication with the second fuel pump outlet via the one or more first injection ports and being in fluid communication with the separator retentate outlet via the one or more second injection ports.

Embodiment 13

The dual-fuel engine and fuel system of Embodiment 12, wherein the one or more first injection ports comprise direct injection ports.

Embodiment 14

The dual-fuel engine and fuel system of Embodiment 13 or 14, wherein the spark ignition engine comprises a boosted engine.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The present invention has been described above with reference to numerous embodiments and specific examples. Many variations will suggest themselves to those skilled in this art in light of the above detailed description. All such obvious variations are within the full intended scope of the appended claims.

The invention claimed is:

1. A method of operating a spark ignition engine, comprising:
    exposing a fuel comprising 5 vol % to 85 vol % of ethanol to a membrane under osmosis conditions to form at least a permeate comprising an ethanol-enriched fraction and a retentate, the ethanol-enriched fraction comprising 10 vol % or more of ethanol;
    combusting, during a first time period, at least a portion of the permeate in a combustion chamber to operate the engine;
    combusting, during a second time period, at least a portion of the retentate in the combustion chamber to operate the engine,
    wherein the osmosis conditions include exposing the fuel to the membrane such that the pressure of the permeate exiting the membrane has a pressure of 1.0 MPa-g to 20 MPa-g higher than the pressure of the fuel entering the membrane.

2. The method of claim 1, wherein the permeate comprises 20 vol % of ethanol or more.

3. The method of claim 1, wherein the membrane comprises a porous carbon membrane.

4. The method of claim 1, wherein the osmosis conditions further comprise forming the permeate at a pressure of 90 kPa-a to 1000 kPa-a.

5. The method of claim 1, wherein the osmosis conditions further comprise exposing the fuel to the membrane at a temperature of −30° C. to 100° C.

6. The method of claim 1, wherein a RON of the permeate is at least 5 greater than a RON of the fuel.

7. The method of claim 1, wherein a RON of the permeate is at least 95.

8. The method of claim 1, wherein a RON of the retentate is at least 2 lower than a RON of the fuel.

9. The method of claim 1, wherein a RON of the retentate is 84 or less.

10. The method of claim 1, wherein the engine operates at a compression ratio of 10.5 or more, or wherein the engine comprises a boosted engine that operates at an effective compression ratio of 10.5 or more.

11. A dual-fuel engine and fuel system, comprising:
- a first fuel pump comprising a first fuel pump intake in fluid communication with a fuel tank and a first fuel pump outlet;
- a reverse osmosis membrane separator comprising a porous carbon membrane, a separator inlet, a separator retentate outlet, and a separator permeate outlet, the separator inlet being in fluid communication with the first fuel pump outlet;
- a second fuel pump comprising a second fuel pump intake in fluid communication with the separator permeate outlet and further comprising a second fuel pump outlet; and
- a spark ignition engine comprising one or more combustion zones, the one or more combustion zones being in fluid communication with the second fuel pump outlet and being further in fluid communication with the separator retentate outlet;
- wherein the reverse osmosis membrane separator has a hydraulic pressure differential of 20 MPa-g between a shell side and a bore side of the separator.

12. The dual-fuel engine and fuel system of claim 11, wherein the one or more combustion zones are further in fluid communication with the fuel tank via an accumulator.

13. The dual-fuel engine and fuel system of claim 11, further comprising a third fuel pump comprising a third fuel pump intake and a third fuel pump outlet, the reverse osmosis membrane separator being in indirect fluid communication with the first fuel pump outlet via the third fuel pump intake and the third fuel pump outlet.

14. The dual-fuel engine and fuel system of claim 11, wherein the one or more combustion zones comprise one or more first injection ports and one or more second injection ports, the one or more combustion zones being in fluid communication with the second fuel pump outlet via the one or more first injection ports and being in fluid communication with the separator retentate outlet via the one or more second injection ports.

15. The dual-fuel engine and fuel system of claim 14, wherein the one or more first injection ports comprise direct injection ports.

16. The dual-fuel engine and fuel system of claim 14, wherein the spark ignition engine comprises a boosted engine.

* * * * *